United States Patent [19]

Itabashi

[11] Patent Number: 5,033,844
[45] Date of Patent: Jul. 23, 1991

[54] CAMERA EMPLOYING AUTOMATIC FOCUSING UNIT

[75] Inventor: Tomoaki Itabashi, Shiki, Japan

[73] Assignee: Asahi Kogaku Kogyo Kabushiki Kaisha, Tokyo, Japan

[21] Appl. No.: 469,015

[22] Filed: Jan. 23, 1990

[30] Foreign Application Priority Data

Jan. 25, 1989 [JP] Japan .................................. 1-7152

[51] Int. Cl.⁵ ............................................. G03B 13/36
[52] U.S. Cl. ..................................... 354/406; 354/478
[58] Field of Search ............................... 354/406, 478

[56] References Cited

U.S. PATENT DOCUMENTS

| 4,104,652 | 2/1978 | Hosoe et al. |
| 4,170,410 | 10/1979 | Sekida et al. |
| 4,180,309 | 12/1979 | Miyata et al. |
| 4,314,747 | 2/1982 | Haraguchi et al. |
| 4,348,088 | 9/1982 | Yamamichi et al. |
| 4,427,277 | 1/1984 | Haraguchi |
| 4,470,686 | 9/1984 | Miyata |
| 4,536,070 | 8/1985 | Shono |
| 4,615,602 | 10/1986 | Eguchi ........................... 354/478 |

FOREIGN PATENT DOCUMENTS

| 2239670 | 3/1973 | Fed. Rep. of Germany . |
| 16-16224 | 9/1941 | Japan . |
| 51-52642 | 4/1976 | Japan . |
| 54-181812 | 12/1979 | Japan . |
| 55-87128 | 7/1980 | Japan . |
| 56-45810 | 4/1981 | Japan . |
| 56-69719 | 6/1981 | Japan . |

OTHER PUBLICATIONS

Copy of United Kingdom Search Report.

Primary Examiner—Russell E. Adams
Attorney, Agent, or Firm—Sandler, Greenblum & Berstein

[57] ABSTRACT

A camera employing an automatic focusing unit for detecting an optical image through a photographic lens and for outputting an image signal. The automatic focusing unit has a window for introducing the optical image thereinto and comprises a mounting member on which the automatic focusing unit is mounted. The mounting member has a hole for allowing the optical image to pass therethrough and a pair of nested mounting cylindrical members acting as a guide are provided between the mounting member and the automatic focusing unit and surrounding the optical path therebetween for guiding the automatic focusing unit in the direction toward and away from the mounting member. A biasing member, such as coil spring is provided on the outer periphery of the cylindrical members for biasing the automatic focusing unit in the direction away from the mounting member. Fixing elements are provided for adjustably fixing the position of the automatic focusing unit to the mounting member against biasing force of the coil spring so that the image receiving plane of the automatic focusing unit is placed at an optically equivalent position to that of a film plane with respect to the photographic lnes.

9 Claims, 3 Drawing Sheets

CAMERA EMPLOYING AUTOMATIC FOCUSING UNIT

BACKGROUND OF THE INVENTION

This invention relates to a camera employing an automatic focusing unit for detecting an optical image through a photographic lens and for outputting an image signal, and more particularly to an arrangement for mounting the automatic focusing unit on the camera.

Various cameras provided with automatic focusing systems have recently been developed and brought into commercial markets.

In single-lens reflex cameras, an AF (automatic focusing) -sensor module operating as an automatic focusing unit for detecting the condition of optical image formed on the focal plane using an image sensor is generally employed. The module is disposed in the camera in such a fashion that its light receiving surface is placed at the optically equivalent position with a film plane.

Since the precision in the positional arrangement of the AF-sensor module in the camera directly affects the focusing performance, its light receiving surface and the film plane have to be precisely equivalently positioned.

FIGS. 1 and 2 show an example of a conventional mounting arrangement of the AF-sensor module.

An AF-sensor module 2A is fitted to the undersurface of a bottom plate 12 of a mirror-box 1A accommodating a quick return mirror 10.

A square hole 12a of predetermined size is formed in the bottom plate 12 of the mirror-box 1A. Light C carrying an optical image from a photographic lens, not shown, and through the half-mirror portion formed at the center area of the quick return mirror 10 is reflected downwardly by a mirror 11 disposed at a predetermined angle on the rear side of the quick return mirror. The light C is then emitted from the square hole 12a out of the mirror-box 1A (FIG. 2).

Three mounting bosses 13 project from the undersurface of the bottom plate 12 and are arranged around the square hole 12a. Fitting plates 21 are provided on the case 20 of the AF-sensor module 2A, on which three bores 3a are formed in positional relations with the bosses 13, respectively. The AF-sensor module 2A is held at the bottom plate 12 of the mirror-box 1A by means of three mounting screws 3, each of which passes through the bore 3a and screwed into the mounting boss 13, respectively.

A spring 4 is put on the outer periphery of each mounting boss 13 so that the resilient force of the spring 4, held between the fitting plates 21 and the bottom plate 12 of the mirror box 1A, biases the AF-sensor module 2A in the direction away from the mirror box 1A. In other words, the resilient force of the springs 4 keeps biasing the fitting plate 21 of the AF-sensor module 2A toward the head-side of the mounting screws 3 so as to prevent an unsteady sway.

The optical distance between the undersurface of the bottom plate 12 and the light receiving surface 25a of the AF-sensor module 2A can be changed by fastening or loosening the mounting screws 3 while ensuring that the optical axis crosses the light receiving surface of the AF-sensor module 2A at a right angle, whereby the light receiving surface 25a of the AF-sensor module 2A can be optically equivalently positioned with the film plane.

The light C carrying the optical image emitted from the square hole 12a out of the mirror-box 1A is directed into the AF-sensor module 2A by way of a window 20a where a lens 22 is fitted, a mirror 23, and a lens 24, and then reaches the light receiving surface 25a of a CCD (Charge Coupled Device) sensor 25 of the AF-sensor module 2A to form an optical image. Then the optical image is converted into image signals by the CCD sensor 25. That is, the AF-sensor module 2A outputs the image signal. Based on the image signals outputted from the AF-sensor module 2A, a focusing data signal is obtained.

In the aforementioned arrangement for adjusting the position and angle of the AF-sensor module 2A by tightening or loosening the mounting screws 3 while maintaining the condition that the AF-sensor module 2A is forced against the heads of the three mounting screws by means of the respective springs 4, the use of many small precision parts (the springs 4 in particular) unavoidably results in high manufacturing cost with troublesome assembly work because a number of small parts must be assembled.

When the screwed amounts of the three mounting screws 3 differ substantially from each other, the AF-sensor module 2A tends to tilt accordingly. Even when the AF-sensor module 2A is simply assembled at the preceding stage of the adjusting process, all the three mounting screws 3 have to be uniformly tightened and this further results in the troublesome assembly work.

Further, since ambient light may invade the optical path, the process for adjusting the mounting position of the AF-sensor module on the mirror-box has conventionally been done in a dark-box, which also makes the assembly work troublesome.

Furthermore, when the assembled mirror-box and AF-sensor module are installed in a camera, because of an adjusting space between the undersurface of the bottom plate 12 and the surface of the AF-sensor module 2A, ambient light which causes the low performance of the AF-sensor module may invade the optical path of the image carrying light, and dust is allowed to penetrate through the adjusting space and consequently stick to the light incident portion thereof (on the surface of the lens 20a), which causing the low measurement accuracy. The disadvantage also is caused when dust is allowed to penetrate via the square hole 12a into the mirror-box 1A.

SUMMARY OF THE INVENTION

It is therefore an object of the invention to provide an arrangement for mounting an automatic focusing unit on a camera using a smaller number of readily producible parts in order to reduce manufacturing cost and improve assembly work efficiency while preventing invasion of ambient light when the function of the AF-sensor module is tested to appropriately position it in a camera as well as the AF-sensor module is actually operated to take a picture, and preventing dust from penetrating through the space where the automatic focusing unit is mounted.

In order to accomplish the object, according to the invention, there is provide a camera employing an automatic focusing unit for detecting an optical image obtained through a photographic lens and outputting an image signal. The automatic focusing unit has a window for introducing said optical image thereinto.

The camera includes a mating member on which the automatic focusing unit is mounted, the mating member having a hole for allowing the optical image to pass therethrough;

A guide member is provided between the mating member and the automatic focusing unit surrounding the optical path therebetween for guiding the automatic focusing unit in the direction toward and away from the mating member;

A biasing element for biasing the automatic focusing unit in the direction away from the mating member is provided a mounting member for adjustably mounting the automatic focusing unit to the mating member against biasing force of the biasing element so that the image receiving plane of the automatic focusing unit is placed at an optically equivalent position to that of a film plane with respect to the photographic lens.

DESCRIPTION OF THE ACCOMPANYING DRAWINGS

DESCRIPTION OF THE EMBODIMENT

Figure 3:
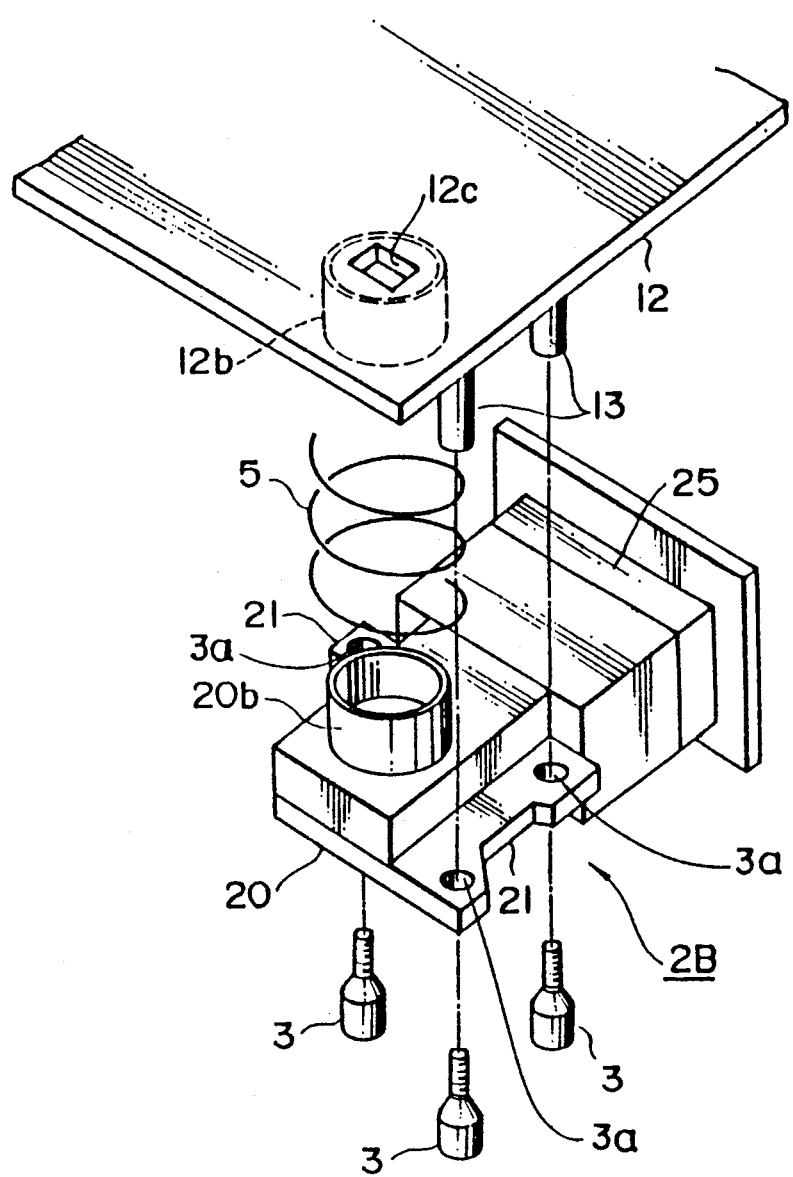
FIG. 3 is an exploded perspective view of an arrangement for mounting an automatic focusing unit of a camera according to the present invention.
Figure 4:
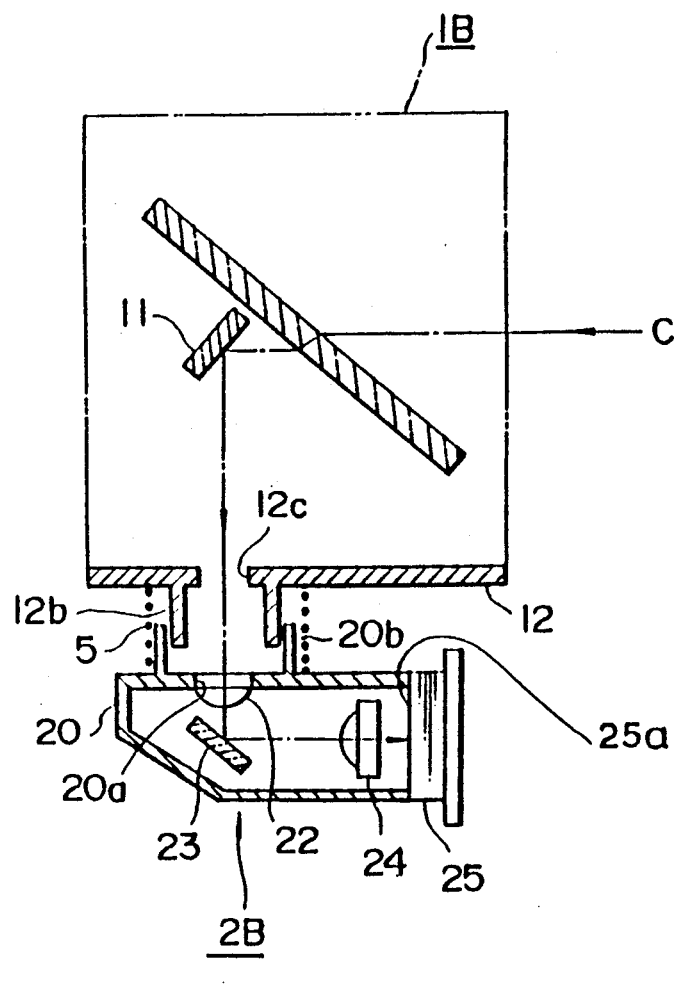
FIG. 4 is a sectional view of a mirror-box and automatic focus unit of FIG. 3.

FIG. 3 is an exploded perspective view of an arrangement for mounting an automatic focusing unit in a camera embodying the invention, and FIG. 4 is a sectional view thereof.

Figure 1:
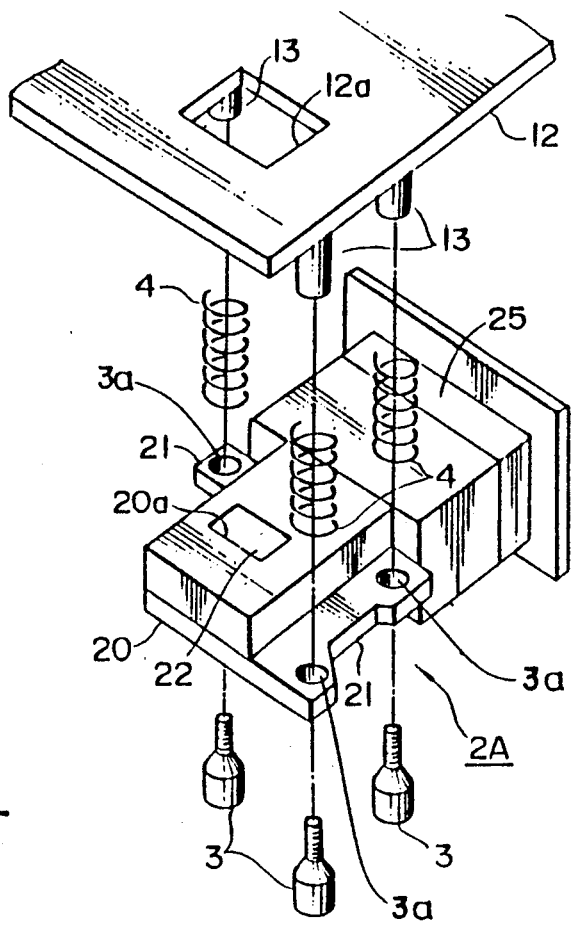
FIG. 1 is an exploded perspective view of a conventional arrangement for mounting an automatic focusing unit.
Figure 2:
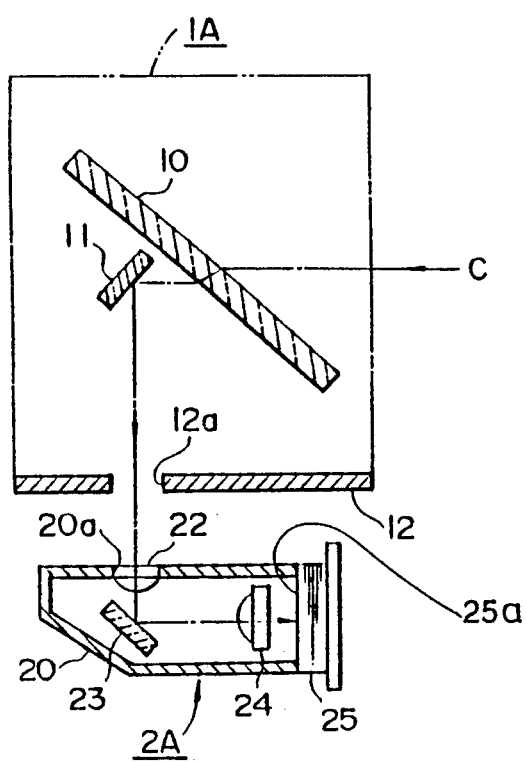
FIG. 2 is a sectional view of a mirror-box and conventional arrangement for mounting the automatic focusing unit of FIG. 1.

The arrangement of FIGS. 3 and 4 is substantially similar in component parts to the conventional one shown in FIGS. 1 and 2, wherein the AF-sensor module 2A is fitted to the bottom plate 12 of the mirror-box 1A.

In the arrangement of FIGS. 3 and 4, however, a square hole 12c is formed on the bottom plate 12 of a mirror box 1B. Light C carrying optical image through a photographic lens, not shown, and through the half-mirror portion formed at the center area of the quick return mirror 10 is reflected downwardly by a mirror 11 disposed at a predetermined angle on the rear side of the quick return mirror 10, then the light C is emitted from the square hole 12c toward the AF-sensor module 2B. A guide tube 12b is projected from the undersurface of the bottom plate 12 to encircle the square hole 12a. The square hole 12c is used as a guide member in the form of a cylinder having a predetermined outer diameter and a peripheral wall of predetermined height. Three mounting bosses 13 are projected in positions around the guide tube 12b.

A window 20a is formed on the surface of the AF-sensor module 2B and a lens 22 simultaneously used as a dust-proof glass panel is fixedly fitted in the window 20a. The incident light C carrying the optical image is directed by way of the window 20a where the lens 22 is fitted, a mirror 23, and a lens 24, then reaches the light receiving surface of the CCD sensor 25 to form an optical image. Then the optical image is converted into image signals by the CCD sensor 25. That is, the AF-sensor module outputs the image signals. Based on the image signals, a focusing data signal is obtained.

A guide tube 20b is projected from the surface of the AF-sensor module 2B so as to encircle the lighting hole 20a and used as a guide member in the form of a cylinder having a predetermined outer diameter and a peripheral wall of predetermined height; moreover, a fitting plates 21 are formed on the sides thereof.

The inner diameter of the guide tube 20b is set in such a manner that the guide tube 12b projected from the bottom plate 12 may be free-fitted into the guide tube 20b with predetermined fitting tolerances. The guide tube 12b is free-fitted into the guide tube 20b, whereby the AF-sensor module 2B is guided in the direction in which it is moved, whereas its angle becomes adjustable within a range of sufficient fitting tolerances and its light receiving surface is optically equivalently positioned to the film surface.

A coil spring 5 is put on the outer periphery of the guide tube 20b of the AF-sensor module 2B and the guide tube 12b of the bottom plate 12 is free-fitted into the guide tube 20b. Three mounting screws 3, each of which passes through the bore 3a are screwed into the mounting boss 13, respectively. The AF-sensor module 2B is thus mounted on the mirror-box 1B.

The resilient force of the coil spring 5 held between the bottom plate 12 and the AF-sensor module 2B biases both of them separate from each other.

In the aforementioned arrangement for mounting an AF-sensor module, the position of the AF-sensor module 2B can be changed by fastening or loosening the mounting screws 3 while maintaining the condition that the optical axis crosses the light receiving surface of the AF-sensor module 2B at right angle, thereby the light receiving surface 25a can be optically equivalently positioned with the film plane.

As set forth above, the AF-sensor module 2B is guided by the guide tubes 20b and 12b fitted together and can be moved toward and away form the mirror-box 1B while the desired positional relationship therebetween is maintained. Furthermore, the angle of the light receiving surface of the AF-sensor module 2B is adjustable within a range of free-fitting tolerances between the guide tubes 12b and 20b. Accordingly, the positioning of the light receiving surface of the AF-sensor module 2B can readily be made by fitting the guide tubes 12b and 20b together, when the AF-sensor module 2B is assembled. Moreover, the AF-sensor module 2B is prevented from being mounted with inclination exceeding a predetermined value even though the screwed amounts of the three mounting screws 3 extremely differ from each other.

Since the guide tubes 12b and 20b surround the optical path of the image light along the optical axis from the bottom plate 12 up to the AF-sensor module 2B, light from the outside is prevented to coming inside the guide tubes and dust from the outside is prevented from attaching to the lighting window 20a of the AF-sensor module 2B and penetrating into the mirror-box 1B via the square hole 12c.

Although the guide tube 12b of the mirror-box 1B has been arranged in such a manner that it is fitted into the guide tube 20b of the AF-sensor module 2B in the embodiment shown, the guide tube 20b may be fitted into the guide tubes 12b instead. Further, the shapes of the guide tubes 20b and 12b are not limited to being cylindrical.

As set forth above, the arrangement for mounting an automatic focusing unit of a camera according to the present invention not only allows component parts to be readily manufactured but also makes the number of them smaller, whereby improved assembly work efficiency contributes to manufacturing cost reduction.

Since the guide members are usable for encircling the optical path between the mirror-box and the AF-sensor module, moreover, ambient light is prevented from invading the optical axis through the hole of the mating member or the window of the AF-sensor module, and dust is also prevented from attaching to and penetrating into the AF-sensor module and the mirror-box.

What is claimed is:

1. A camera having a photographic lens for forming a photographic image on a film plane and including focus detecting means for detecting an optical image through the photographic lens and for outputting an image signal, said focus detecting means having a window for admitting said optical image into said unit along an optical path onto an image receiving plane of said focus detecting means, said camera comprising:
   a mounting member on which said focus detecting means is mounted, said mounting member having a hole for allowing said optical image to pass therethrough;
   guide means provided between said mounting member and said focus detecting means surrounding the optical path for guiding said focus detecting means in the direction towards and away from said mounting member;
   biasing means for biasing said focus detecting means in the direction away from said mounting member; and
   mounting means for adjustably mounting said focus detecting means to said mounting member against the biasing force of said biasing means so that the image receiving plane of said focus detecting means is placed at an optically equivalent position to that of the film plane with respect to the photographic lens.

2. The camera according to claim 1, wherein said guide means comprises a pair of cylindrical members, one of said cylindrical members extends from said mounting member and is arranged to surround said hole, the other one of said cylindrical members extends from said focus detecting means and is arranged to surround said window, said pair of cylindrical members being slidably fitted to each other with predetermined tolerances.

3. The camera according to claim 1, wherein said focus detecting means comprises a transparent member fitted to said window for preventing dust from penetrating into said focus detecting means.

4. The camera according to claim 3, wherein said transparent member comprises a lens for adjusting the optical distance between the photographic lens and said image receiving plane of said focus detecting means so as to be equivalent to that between the photographic lens and said film plane, irrespective of the difference in actual distances thereof.

5. The camera according to claim 2, wherein said biasing means comprises a coil spring mounted on the outer periphery of said cylindrical members.

6. The camera according to claim 5, wherein said fixing means comprises:
   a plurality of bosses extending from said mounting member;
   at least one plate member having a plurality of bores at positions corresponding to said bosses; and
   a plurality of screw members corresponding to said plurality of bosses, wherein said plurality of screw members are threaded into said plurality of bosses through said bores, respectively, wherein said image receiving plane of said focus detecting means is optically placed at a position equivalent said film plane by fastening or loosening said screw members.

7. A single lens reflex camera comprising a photographic lens and a quick return mirror for forming an optical image on a film plane, said camera further including focus detecting means for detecting an optical image obtained through the photographic lens and for outputting an image signal, said focus detecting means having a window for admitting said optical image thereinto, and a mirror-box for accommodating said quick return mirror, one surface of said mirror-box having a hole in the bottom surface thereof for allowing said optical image to project therethrough, said camera further comprising:
   a pair of cylindrical guide members for guiding said focus detecting means in the direction towards and away from said mirror-box, one of said cylindrical guide members projecting from said one surface of said mirror-box and arranged to surround said hole, the other of said cylindrical guide members projecting from said focus detecting means and arrange to surround said window, said cylindrical guide members being slidably fitted to each other with predetermined tolerances;
   biasing means provided on the outer periphery of said cylindrical guide members for biasing said focus detecting means in the direction away from said one surface of said mirror-box; and
   a plurality of fixing members for adjustably fixing said focus detecting means on said mirror-box against the biasing force of said biasing means so that the image receiving plane of said focus detecting means is placed at an optically equivalent position to that of the film plane with respect to the photographic lens.

8. The camera according to claim 1, wherein said means for adjustably mounting comprises means for enabling adjusting movement of said focus detecting means along the direction of the optical path of said optical image.

9. The single lens reflex camera according to claim 7, said biasing means and said fixing members comprising means enabling adjusting movement of said focus detecting means along the direction of the optical path of said optical image.

* * * * *